United States Patent [19]
van Endert et al.

[11] Patent Number: 5,779,986
[45] Date of Patent: Jul. 14, 1998

[54] REACTOR DEVICE FOR FREE-FLOWING AND HIGHER-VISCOSITY MEDIA

[75] Inventors: Eike Schulz van Endert; Klaus Schröder; Hans-Peter Hoffmann, all of Berlin, Germany

[73] Assignee: Karl Fischer Industrieanlagen GmbH, Berlin, Germany

[21] Appl. No.: 571,137

[22] Filed: Dec. 12, 1995

[30] Foreign Application Priority Data

Dec. 30, 1994 [DE] Germany ............... 44 47 422.9
Sep. 12, 1995 [DE] Germany ............... 295 15 322.9

[51] Int. Cl.$^6$ ............... B01F 15/00; B01F 7/02
[52] U.S. Cl. ............... 422/136; 422/137; 422/138
[58] Field of Search ............... 422/134, 136, 422/137, 138

[56] References Cited

U.S. PATENT DOCUMENTS

| | | | |
|---|---|---|---|
| 3,118,739 | 1/1964 | Atkinson et al. | 422/137 |
| 3,476,523 | 11/1969 | Leybourne, III et al. | 422/137 |
| 3,591,344 | 7/1971 | Schnock et al. | 422/137 |
| 3,595,627 | 7/1971 | Abbott et al. | 422/137 |
| 3,619,145 | 11/1971 | Crawford et al. | 422/137 |
| 3,634,042 | 1/1972 | McCown. | |
| 3,706,719 | 12/1972 | Goffinet, Jr. | 422/137 |
| 3,840,509 | 10/1974 | Kajimoto et al. | 422/137 |
| 3,867,104 | 2/1975 | Leybourne, III et al. | 422/137 |
| 4,343,929 | 8/1982 | Sugiio et al. | 528/241 |
| 5,055,273 | 10/1991 | Wilhelm et al. | 422/135 |
| 5,145,255 | 9/1992 | Shimada et al. | 366/329 |
| 5,599,507 | 2/1997 | Shaw et al. | 422/135 |

FOREIGN PATENT DOCUMENTS 2100615  7/1971  Germany.

Primary Examiner—Nina Bhat
Attorney, Agent, or Firm—Marshall & Melhorn

[57] ABSTRACT

The reactor device comprises a horizontally-disposed housing (1), at one end of which there is disposed an inlet (4) for supply of the medium, and at the other end of which there is an outlet (5) for the reaction products. Within the housing (1) of the reactor device a rotor (1) is rotatably mounted. The rotor (8) has a hollow cylinder (9), which is provided with openings (10) and annular members (12, 13) for moving and transporting the medium. The hollow cylinder (9) is partly immersed in the free-flowing medium, the openings (10) in the hollow cylinder (9) ensuring additional admixture of the medium.

29 Claims, 7 Drawing Sheets

REACTOR DEVICE FOR FREE-FLOWING AND HIGHER-VISCOSITY MEDIA

The invention relates to a reactor device for free-flowing and higher-viscosity media.

There is known from DE 21 00 615 a reaction vessel for materials in a free-flowing condition, particularly for the polycondensation of prepolymers into polyester with a high molecular weight, and which comprises a horizontally-aligned reactor housing with an inlet at one end and an outlet at the other end and an arrangement for moving and transporting the free-flowing material, said arrangement, in the lower region of the interior of the reactor, being rotatable with small degree of play about an axis extending in the direction of the longitudinal axis of the reactor housing. The rotatable moving and transporting arrangement is in the form of a support framework attached to coaxial stub shafts; discs are attached in the region of their circumferences to this support frame. In the direction of the axis of rotation, the discs are successively inclined with respect to said axis in such a way that of the two points which lie on the same diameter on the circumference of each disc and respectively have the smallest distance from each of the two end faces of the reactor housing, the points of all discs respectively lying closer to one of the end faces lie on a helix coaxial with the axis of rotation. The points interconnected by this notional helix are termed trace points. In this way there is achieved a transport of the medium from the inlet to the outlet.

In such a known reactor vessel, for example, free-flowing and viscous monomers and prepolymers are supplied at the inlet to the reactor housing, are moved in the reactor, are locally mixed and transported through the housing, in order in this way to carry out the procedure of a polymerisation process. The polymerisation products are removed at the outlet. The medium present in the reactor is mixed and raised locally by each rotating disc, films and striations of the product forming on the discs, while the viscous medium runs off the discs during the period of the rotary movement. During the mechanical action on the reacting medium the desired polymer is formed out of the raw materials, while reaction components which are released evaporate, and are extracted as exhaust vapours.

The purpose underlying the invention is further to develop a reactor device according to prior art in such a way that a reaction product of excellent quality is achieved with a relatively simple construction with improved stability against warping and bending.

By virtue of the fact that the rotor is in the form of a hollow cylinder connected to the stub shafts and provided with openings, and upon which the annular members are attached transversely to the longitudinal axis of the reactor casing, on the one hand stability is increased and on the other the duration time of the medium may be meaningfully controlled by corresponding design and number of the annular members. The hollow cylinder provided with openings has, because of its high mechanical section modulus, a high degree of resistance to bending, so that the degree of bending is extremely small. At the same time, the openings in the hollow cylinder support the mixing of the medium, forming free surfaces, which favour evaporation.

If the annular members are inclined towards the axis of rotation, they execute a tumbling movement, which effects locally a more intense mixing of the polymer melt. By means of the inclined annular members, the medium is additionally transported from the inlet towards the output cone. The angle of inclination is so selected that a precisely-defined spectrum of duration times is produced over the entire reactor length.

A favourable arrangement of the annular members is achieved by inclining the annular members in such a way that their trace points form a helix over the length of the rotor. This the trace point of an annular member is that point which, with respect to one of the two end faces of the housing, is the smallest distance way. Thus it is sufficient if the annular members have in groups a trace point which lies on such a helix.

A particularly good transportation is effected with this arrangement if the annular members do not hinder too much the axial movement of the medium. For this purpose, on the one hand the slot between housing and external diameter of the annular members must be so selected that the rotating annular members oppose to the flow of medium a resistance which is smaller than the transporting movement achieved by the off-setting of the trace points. On the other hand, the annular members and discs must be provided with openings such that the increasing viscosity of the medium along the travel path is taken into account.

It is of particular advantage if, in the direction of travel, the free cross-sections of the annular members and/or the spacings between the annular members and/or the size of the openings in the hollow cylinder increase, this being achievable in zones, as because of these measures adaptation of the reaction conditions to the state of the medium, i.e. substantially its viscosity, is undertaken, so that the spectrum of duration times may be controlled even more precisely. This is reinforced by the fact that the annular members have in groups the same angle of inclination and the same trace point. The grouped arrangement of parallel annular members leads to zones with a reduced axial transporting effect, i.e. cascade-like zones are formed by means of which the duration time pattern for various products may be adapted in correspondence with the kinetics of the reaction.

In order to increase the cascading effect of discs in a grouped setting with identical trace point setting, these may also for example be so constructed that when a group of three discs is provided, the central disc has a lesser or opposed inclination, or has a trace point which is off-set back, which has a favourable influence on the mixing effect within a cascade group.

The construction of the reactor may be simplified in that the same constructive conditions are provided for groups or zones.

By means of the provision of additional rings, which are attached to the internal circumference of the hollow cylinder, the medium or the resultant foam is decelerated on the internal walls of the hollow cylinder in order to counter axial through-flow and in order to prevent direct axial further flow on the inner walls of the hollow cylinder, the foam arising particularly in the initial area of the reactor in which the expansion and main gas extraction zone lies, and where violent reactions occur.

By means or providing one or a plurality of baffle arrangements, the medium is deflected in a controlled manner, and a cascading effect is also thereby achieved.

More advantageously, in the higher-viscosity region, stripper rods are disposed between the annular members in the sump of medium, by means of which bridge formation between the discs and excessive oblique positions of the level are avoided. With corresponding formation, e.g. in a shape like a ploughshare, these stripper rods contribute to mixing and transporting the medium.

The design of the outlet as an output cone and a baffle disposed in front of the output cone with a stripper rotating at that point and a mixer, provide a more uniform output flow of the medium, the baffle representing a decoupling from the rotary motion, and a horizontal, measurable level of medium is achieved which is independent of the velocity of the basket mixer.

In order to keep the container surfaces above the fluid level free of deposits, the eccentric arrangement of hollow cylinder and reactor housing in conjunction with the arrangement of the gas extraction nozzle at the rear end of the reactor casing make some contribution. The through-flowing reaction vapours bring about a washing effect, while simultaneously, due to the output area, which is enlarged by the output cone described, a suction effect at the particularly critical lower wall areas of the gas extraction nozzle, and thus entrainment of particles, are avoided. The construction also described of the hollow cylinder also has an effect here, as the inner area of the hollow cylinder is not blocked by closed, falling films of medium. The medium rather falls in skeins between the openings in the hollow cylinder, so that sufficient free area remains for the removal of the reaction vapours, i.e. the speeds are low enough in order to prevent entrainment of product.

As a further measure, the adhesion of oligomers and the formation of undesired deposits are avoided by controlled additional heating in the upper peak area of the housing.

BRIEF DESCRIPTION OF THE DRAWING

Two embodiments of the invention given by way of example are explained in more detail in the following description and illustrated in the drawings. Shown are.

EXAMPLE 1

Figure 1:
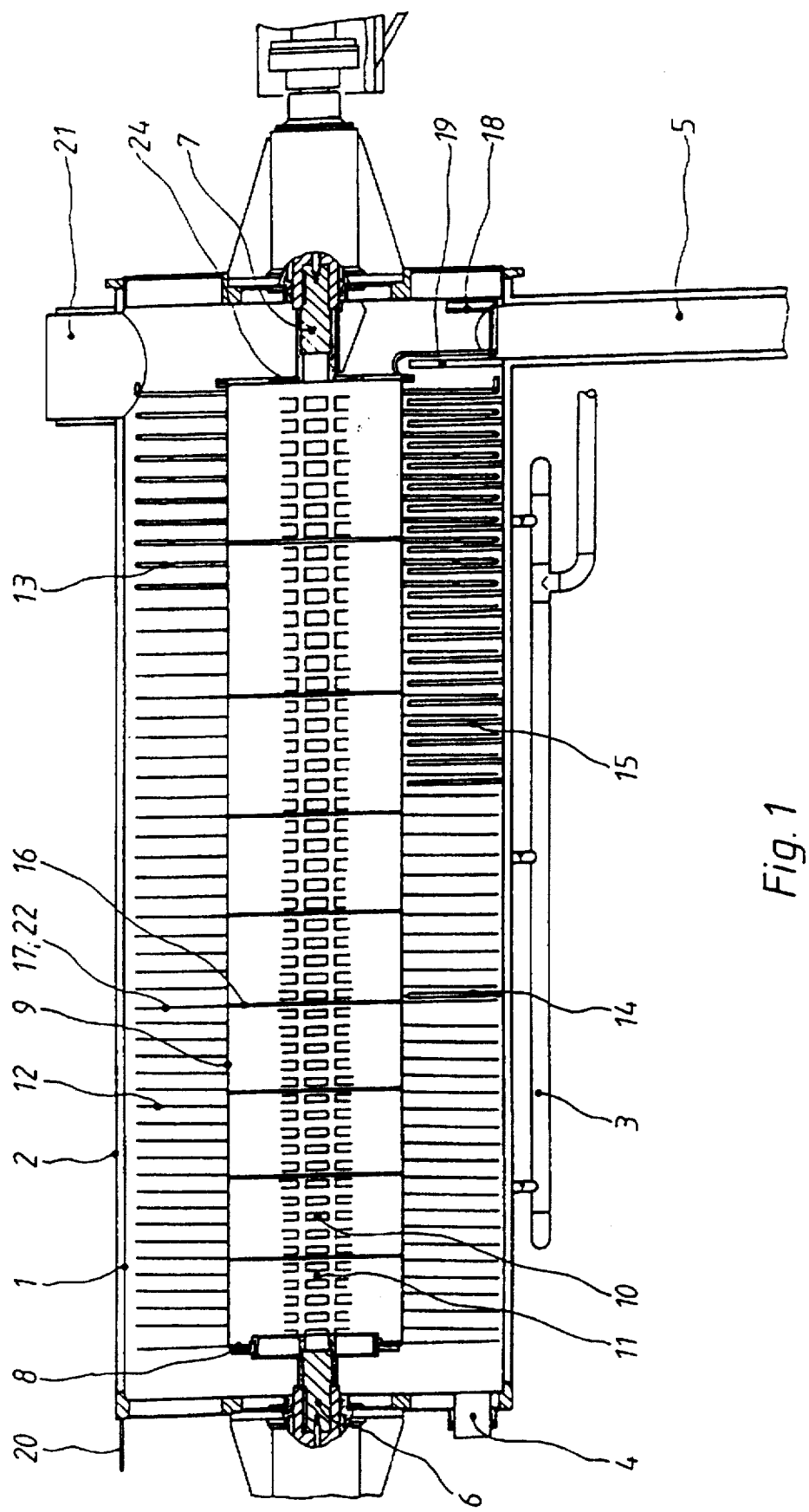
FIG. 1: A cross-section through a reactor device according to the invention.

The reactor illustrated in FIG. 1 is particularly suitable for free-flowing media. It has a housing 1, provided with a heating jacket 2, a heat-conducting medium being passed via a pipeline 3 at a plurality of points, seen over the length of the housing 1, at both sides into the heating jacket 2. By means of this measure, distortion is avoided during heating-up of the overall reactor device. Provided at one end in the housing is an inlet 4 for the input of polymer, and at the other end an outlet 5 for the extraction of polymer. Rotarily mounted in the housing 1 via stub shafts 6, 7 which are passed through the end walls of the housing, is a rotor, the longitudinal axis of this rotor 8 in the embodiment being slightly off-set downwards (see FIG. 1) to the longitudinal axis of the housing 1, in order to leave free in the upper area slightly more space for the reaction vapours, e.g. glycol and aldehyde vapours or other such gases. At the other end of the housing 1, seen in the transport direction of the polymer, there is disposed a gas extractor nozzle 21.

The rotor 8 has a hollow cylinder, a cylindrical basket 9 provided with rectangular openings 10, between which there remain longitudinally and transversely-oriented webs 11, so that a grid-shaped arrangement or a grid-shaped frame results. Basically the term hollow cylinder 9 refers to such a grid-shaped arrangement, the type and method of its production not being essential to the invention. It is advantageous if the webs are continuous in design. Securely disposed in sequence on the outer surface of the hollow cylinder 9 or on the webs 11 are perforated discs 12 and spoked wheels 13 as transporting and stirring members, seen over the length of the rotor 8. Provided between the perforated discs in the lower area of the reactor housing 1, i.e. at a point where the polymer sump is located, there is provided between two successive perforated discs 12 or spoked wheels 13 at least one baffle arrangement 14, 17 and rod-shaped strippers 15.

As is to be seen, the reactor is subdivided over its length into three different zones, the spaces between the annular perforated discs 12 or spoked wheels 13 from one another for example varying from zone to zone. This signifies that the spacings of the annular discs 12 in the inlet area are smaller than in the central area, and these in turn are smaller than in the terminal area. Likewise, the size of the openings 12 in the hollow cylinder 9 increases. The annular discs 12 are provided over their entire cross-section with a plurality of holes, and the spoked wheels have longitudinal and transverse spokes, the size of the holes, i.e. the free cross-section of the annular discs 12 increasing from the front backwards, or the number of spokes 13 also decreasing from zone to zone. As is to be seen from the last three spoked wheels 13, no further transverse spokes are present. The alterations need not be undertaken in zones over the length of the reactor, but can be constructed as continuous.

As is to be seen from the Figure, the annular discs 12 and the spoked wheels 13 are disposed at an inclination to the longitudinal axis of the hollow cylinder 9; the angles of inclination can vary, i.e. the angles of inclination become smaller from the inlet of the polymer until its outlet. The angles of inclination are selected in dependence of the material to be processed, and for example like between 0° and 40°, preferably between 0.5° and 2.50°, the diameter also of the discs or disc rings also however playing a part. What is not to be seen from the drawing is the fact that the annular discs 12 or the spoked wheels 13 are off-set to one another in groups in such a way that their "trace points" lie on a helical or spiral line. In this case the term "trace points" is intended to indicate that point on the circumference of the discs 12 or spoked wheels 13 which lies with respect to the disc under consideration nearest to one end wall, and furthest away from the other end wall of the housing 1. Of the discs 12 or spoked wheels 13, one group has for example a plurality of successive discs, and has the same "trace point", whereas the next group, seen in the circumferential direction, has a "trace point" off-set to that of the first group. The angle between the "trace points" of the successive groups of annular discs is selected in dependence on the desired duration time of the medium in the reactor. The angle of inclination of the discs 12 or spoked wheels 13 may vary in groups or zones. Upon one revolution of the entire group, the medium in the vicinity of the group is transported forwards and backwards to a specific part, while another part passes into the vicinity of the next group. In this way also control of the spectrum of duration times is achieved.

The medium to be processed, which takes up approximately 18 to 22% of the overall volume of the reactor, is drawn along by the movement of the annular discs 12 or of the spoked wheels 13, and runs off them, threads and free surfaces forming simultaneously at the openings 10 in the hollow cylinder 9, these furthering the reaction. The external diameter of the hollow cylinder 9 terminates in the lower area of the reactor slightly above the filling level of the medium.

At specific distances apart, seen over its length, annular discs 16 are attached in the internal space of the hollow cylinder 9, said discs on the one hand decelerating the foam from the medium and on the other hand in turn forming drainage members for the medium.

Figure 2:
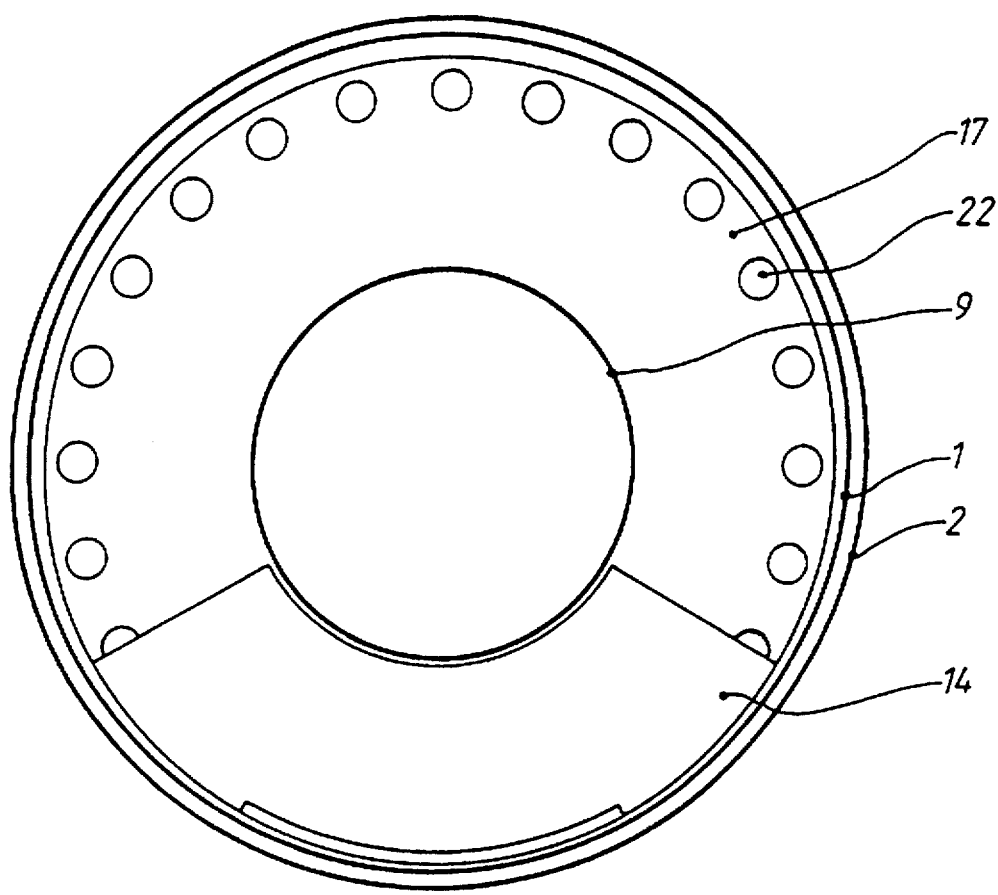
FIG. 2: A plan view of the baffle arrangement used in FIG. 1.

According to FIG. 2, there is provided behind the first zone a baffle arrangement, made up of disc 17, disposed at an angle of 90° to the longitudinal axis of the hollow cylinder 9, and upon this hollow cylinder, and of a baffle plate 14. The baffle plate 14 is securely connected to the housing 1, extends approximately as far as the hollow cylinder 9, and is arcuate in form. In its outer edge, the disc 17 has perforations 22, and the baffle plate is so disposed that a slot is present between the housing 1 and the lower edge of the baffle plate 14. The medium is guided by this baffle arrangement 17, 14, and this is a further measure in order to control the spectrum of duration times.

Figure 3:
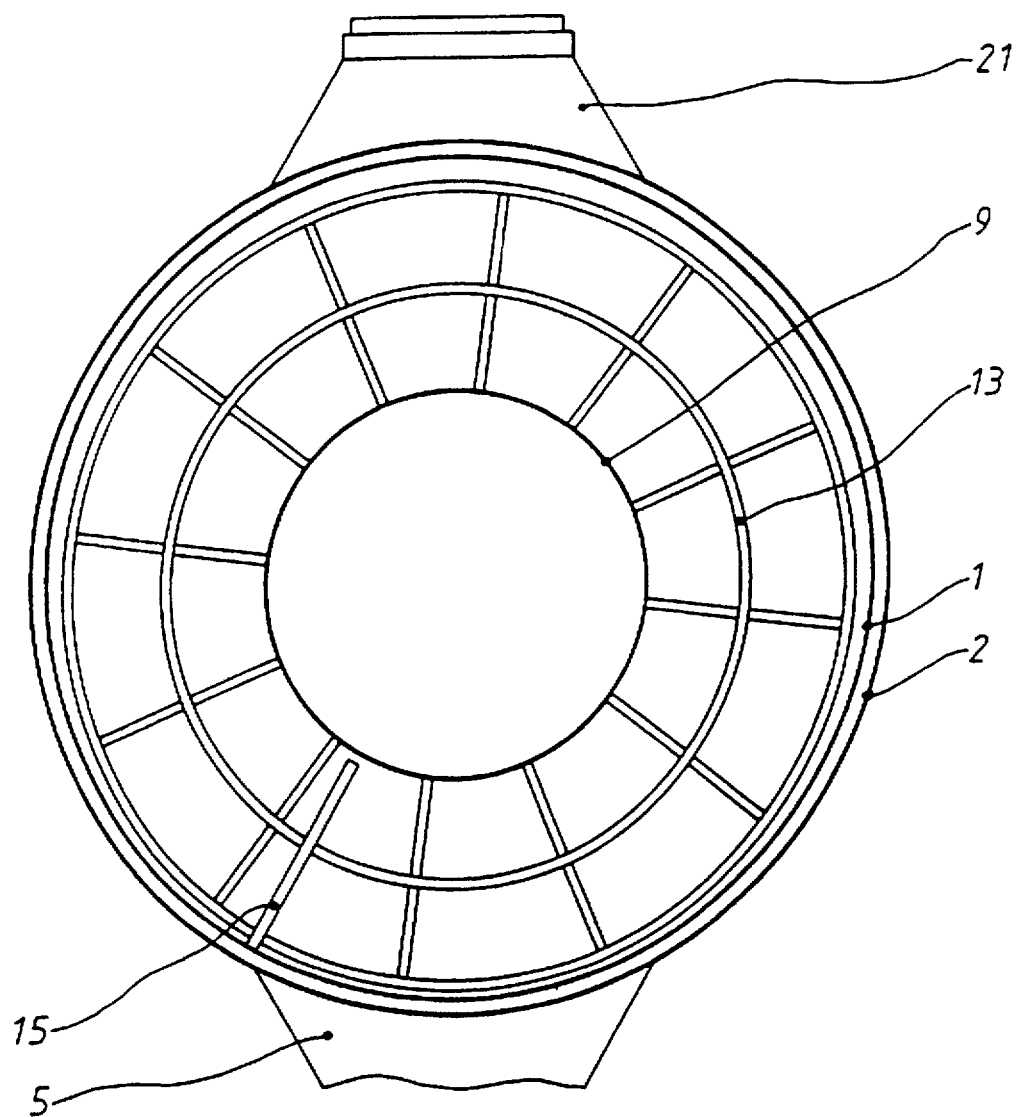
FIG. 3: A plan view of the rod-shaped stripper members disposed between the annular members.

Attached in the sump of the medium according to FIG. 3, on the housing 1, are the stripper rods, which are disposed obliquely off-set in the direction of rotation, and are located in the medium. At higher viscosities, these stripper rods 15 avoid the formation of bridges between the spoked wheels 13, and of adhesions, and by means of the flow resistance, in addition, reduce the tendency of the medium, following the direction of rotation, to adopt an oblique configuration. The shape of these stripper rods 15 may be optional; they may for example have a circular or streamline-shaped cross-section. They may also however be so shaped that they reinforce the transport effect on the medium at higher viscosities; for example they may be obliquely angled in the direction of transport.

Figure 4:
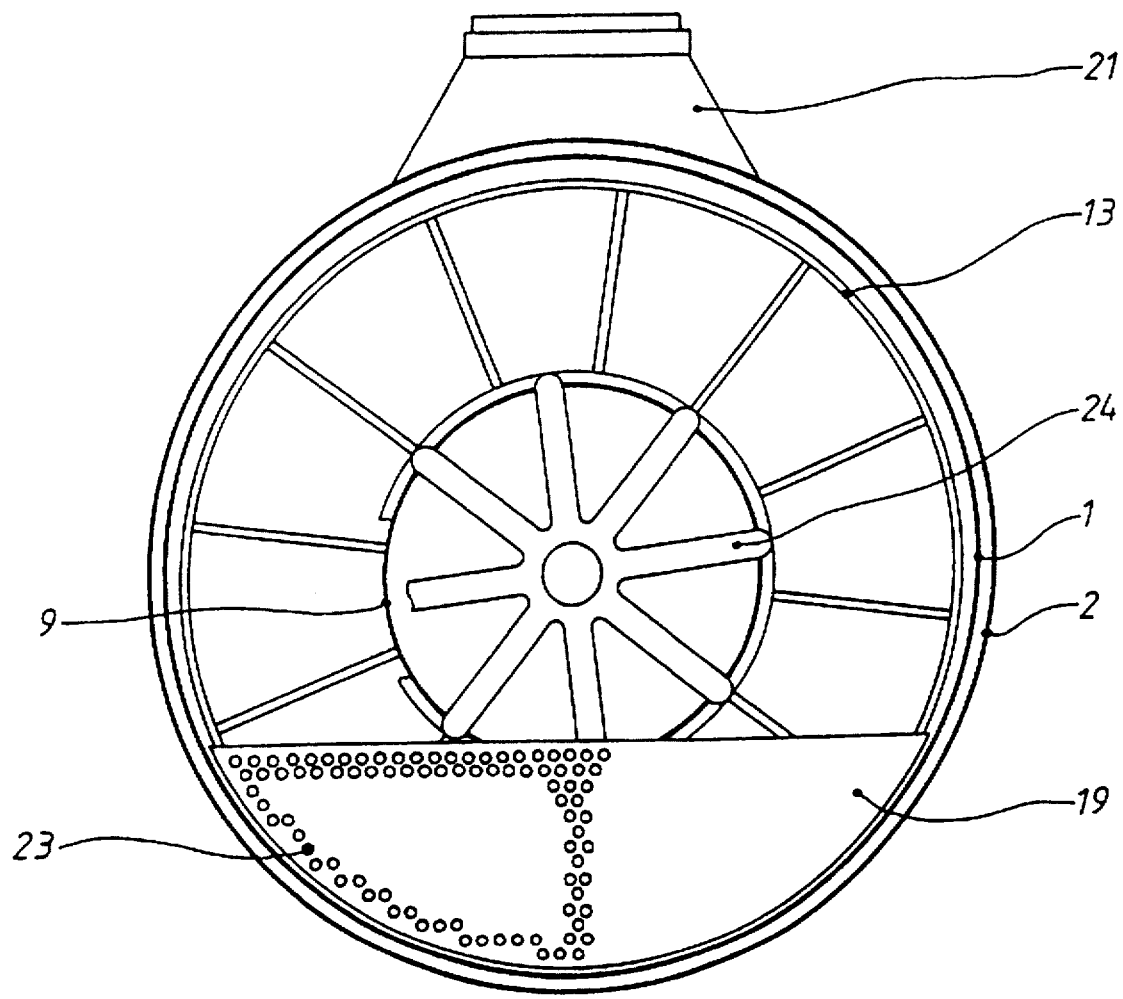
FIG. 4: A plan view of the terminal baffle provided in FIG. 1 in the output area.

The outlet 5 is in the form of a flattened output cone, thus achieving a more uniform output flow. Moreover, extraction is reinforced by a stirring arm and stripper 18, attached to the hollow cylinder 9, and which rotates along with the hollow cylinder 9 and simultaneously strips the end face of the housing 1 and mixes the medium. Furthermore, the more uniform extraction is improved by the provision of a terminal baffle 19, which is segment-shaped and connected to the housing 1, having a plurality of fine perforations 23 (FIG. 4). The terminal baffle 19 is seen from its view from the output cone 5. The hollow cylinder 9 is connected at its end by a star connector 24 comprising strip-shaped plates, to the stub shaft 7. The terminal baffle 9 illustrated prevents an obliquely-positioned level of the medium at the end. This horizontal level enables better radiation measurement by means of a cobalt rod arrangement, or other measurements in order to ascertain the height of the filling level.

The gas extractor nozzle 21 is conical in shape in order to increase the output area, so that entrainment of particles due to suction effect is reduced.

Disposed in the heating jacket 2, and in the upper peak point, there is a pipe circuit 20, through which there flows a heat-transfer medium which is at a higher temperature than the heat-transfer medium of the heating jacket 2. This measure avoids the occurrence of oligomer deposits.

EXAMPLE 2

Figure 5:
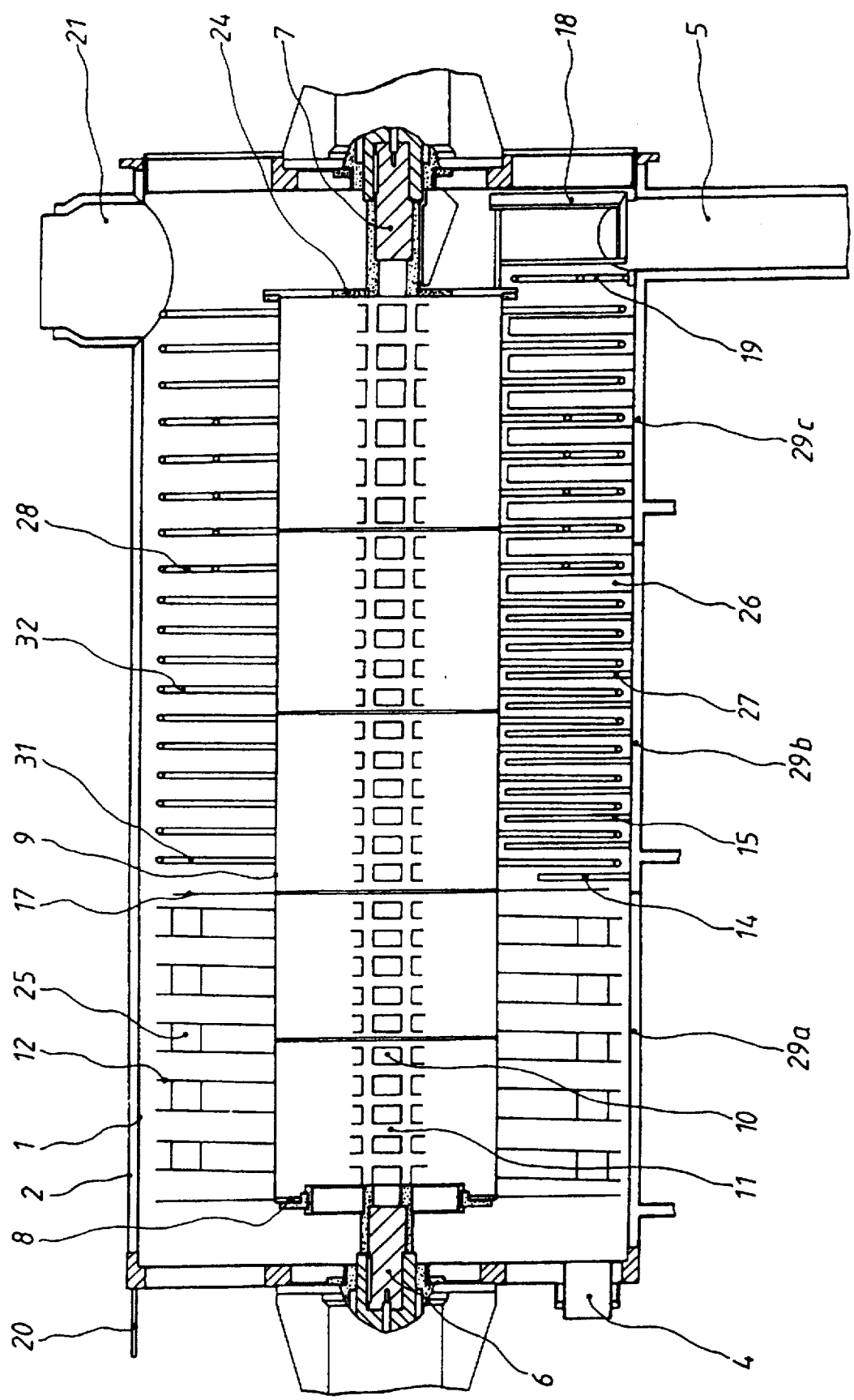
FIG. 5: A cross-section through a second reactor device according to the invention.

The reactor shown in FIG. 5 is in particular suitable for higher-viscosity media. It has a basic structure comparable with that shown in FIG. 1, and differs particularly in the shapes and arrangement of the annular members 12, 13 attached to the rotor, and in the strippers and baffles attached to the inner side of the housing 1.

The housing 1 is provided, like the reactor shown in FIG. 1, with a heating jacket 2. In this reactor arrangement, this heating jacket is subdivided into three zones along the reactor. As the medium passes from the inlet 4 to the output cone 5, the polycondensation continues along the reactor. Due to the subdivision of the reactor into at least three zones 29a, 29b and 29c, in each of these zones, the optimum temperature is set for polycondensation in this zone.

There is located in turn on the upper side of the reactor a pipe circuit 20, through which there flows a heat-transfer medium which is at a higher temperature than the highest of the temperatures in the three heating zones. Thus the deposit of oligomers is prevented in the upper region of the reactor.

The inlet 4, the output cone 5 and the gas extractor nozzle 21 are designed and disposed as in Example 1. In the housing 1 the rotor 8 is rotatably mounted via the stub shafts 6, 7, the axis of rotation of the rotor 8 in turn being off-set slightly downwards to the longitudinal axis of the housing 1. The rotor itself likewise comprises a hollow cylinder 9, attached by a star connector 24 to the stub shaft 7, and shaped as in Example 1. This hollow cylinder also has openings 10 with interposed webs 11, the free cross-section of the openings increasing along the flow direction of the medium.

Attached on the external surface of the hollow cylinder 9 or on the webs 11 are annular members. As regards the provision of annular members, the rotor is subdivided into three zones of substantially equal length. In the forward zone, the tumbling discs 12 known from Example 1 are attached at a slight inclination to the axis of rotation of the rotor 8. In the forward part of the reactor, the viscosity of the medium is still very low. Therefore no stripper rods are provided at that point. Instead of this, scoop members 25 ensure a powerful mixing action of the medium.

Figure 6C:
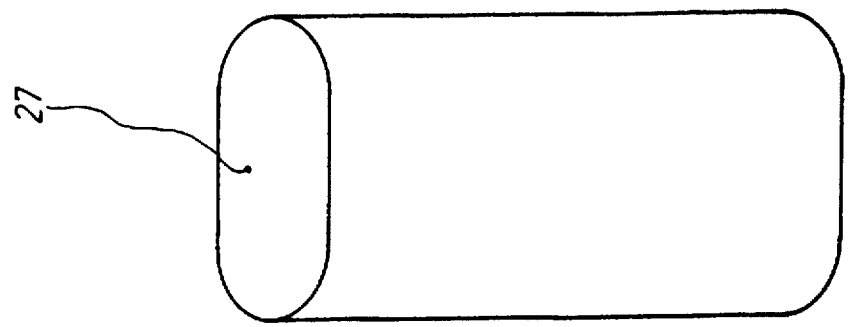
FIG. 6: A plan view of the rod-shaped and plough-share-shaped strippers provided in FIGS. 1 and/or 5.
Figure 6B:
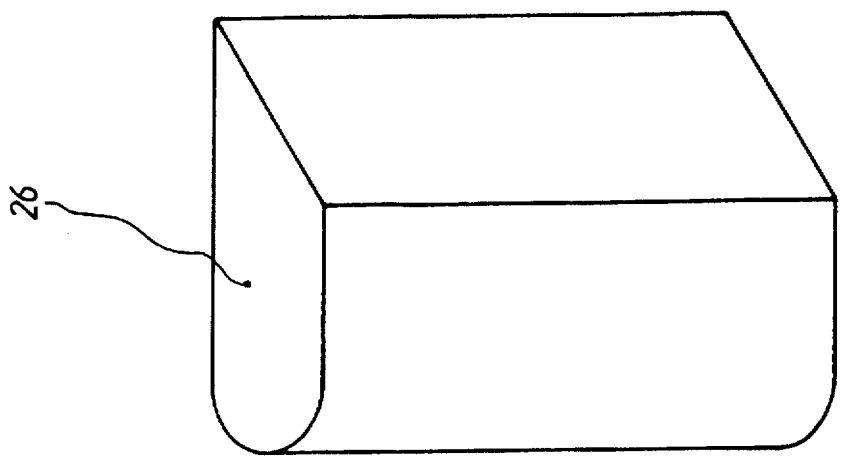
Figure 6A:
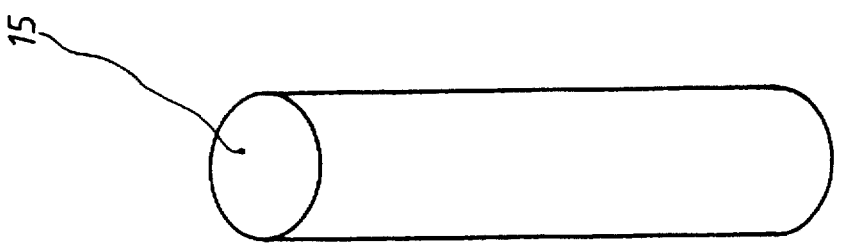

As annular members, there are attached to the hollow cylinder 9 in the central region of the rotor straight-spoked rings 31 and/straight tubular rings 32, likewise slightly inclined to the axis of rotation of the rotor. The tubular rings 32 are partly covered by wire mesh, in order to mix the medium more intensively. Opposite them on the internal side of the housing 1, mounted vertically to the axis of rotation of the rotor, are rod-shaped strippers 15, 27 as shown in FIG. 6. These likewise improve the mixing effect of the medium and prevent the formation of polymer bridges between the tubular or spoked rings. As the tubular and spoked rings are inclined with respect to the stripper rods, cleaning of the rings of adhering polymer is not completely effected.

In the last portion of the reactor, tubular and/or spoked rings 28 are attached as annular members to the external side of the hollow cylinder 9 vertically to the axis of rotation of the rotor. Consequently no transport of the medium is effected by the annular members in this region. Therefore in this region the stripper rods are in the form of a ploughshare 26, as FIG. 6 shows. By means of these ploughshare-shaped strippers 26, the medium is not only mixed but transported in the direction of the output cone 5.

Figure 7:
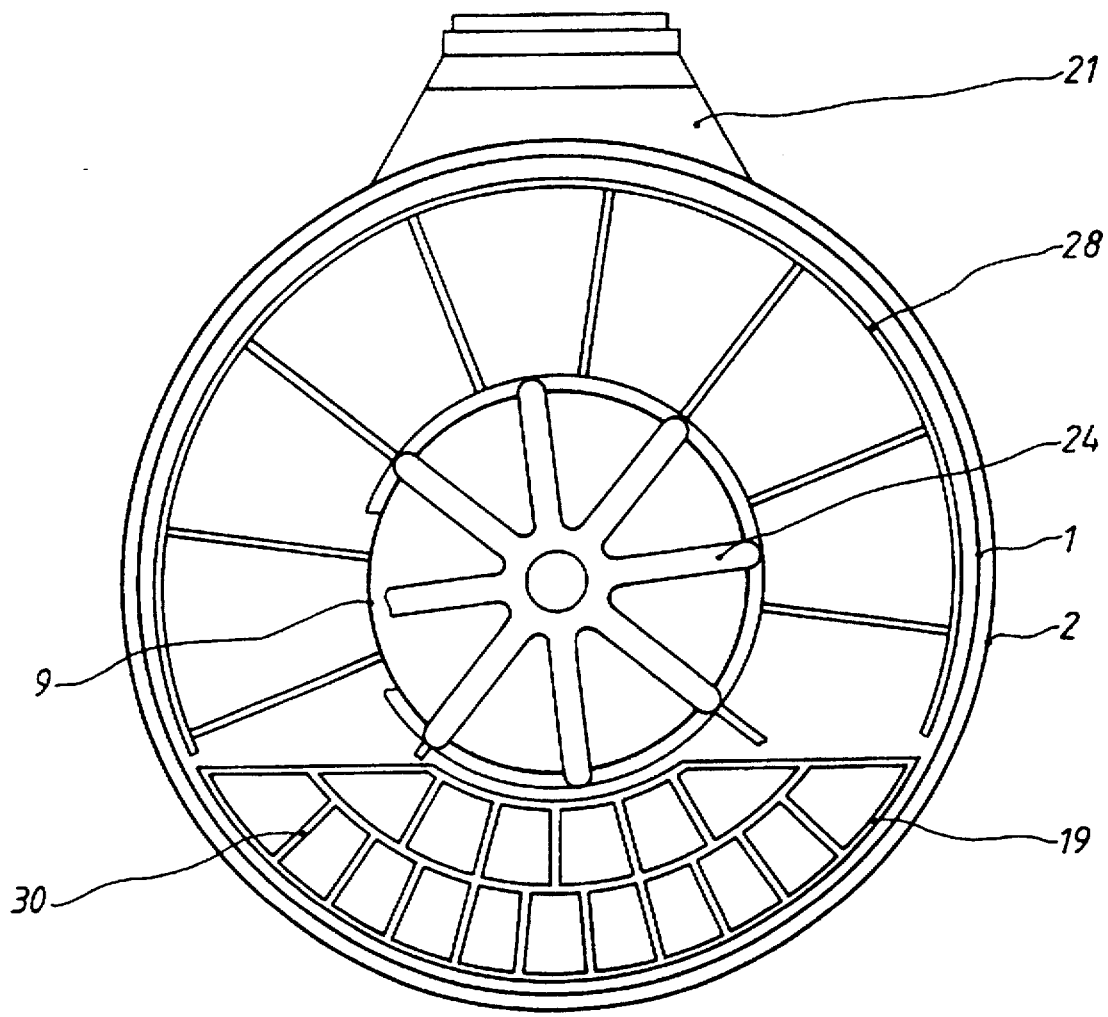
FIG. 7: A plan view of the terminal baffle provided in FIG. 5 in the output area.

Directly before the output cone 5 there is located a mixer arm with strippers 18 and a grid-shaped output baffle 19, comprising a tubular assembly 30 as in FIG. 7. This baffle leads to a decoupling of the medium from the rotary motion of the rotor and there results a horizontal, measurable level of media, which is independent of the velocity of the rotor or of the transport speed of the transporting members.

It has also proved advantageous in this reactor arrangement, for the homogeneity of the polycondensates, to fill approximately 18–22% of the reactor volume with medium.

We claim:

1. Reactor device for free-flowing media, comprising:
   a) a cylindrical housing disposed horizontally, a medium inlet opening and a medium outlet opening at opposing ends of the housing; and
   b) a rotor being rotatably mounted in the housing, the rotor having;
      1) hollow cylinder extending through the housing, the hollow cylinder having openings on its circumference; and
      2) plurality of annular members, the annular members being attached to the hollow cylinder and extending from an outer surface of the hollow cylinder, the annular members mixing and/or transporting the medium rotational movement of the rotor, the openings providing a medium and gas flow path through the hollow cylinder as the medium is mixed and/or transported.

2. Reactor device according to claim 1, wherein the annular members are disposed at least partly inclined with respect to the axis of rotation.

3. Reactor device according to claim 2, wherein the annular members are disposed inclined with respect to the axis of rotation in such a way that their trace points form a helical line along the length of the rotor, that point on the circumference of the respective annular member being termed a trace point, which has the smallest spacing with respect to one of the two end faces of the housing.

4. Reactor device according to claim 3, wherein the free cross-sections and the slot between housing and external diameter of the annular members are so selected that the rotating annular members provide a resistance to the free unhindered flow of the medium achieved by the off-setting of the trace points.

5. Reactor device according to claim 1, wherein the angles of inclination of the annular members decrease in the direction of transport, i.e. as the viscosity of the medium increases.

6. Reactor device according to claim 1, wherein the free cross-sections of the annular members, and/or the spacings between the annular members, increase in the direction of transport.

7. Reactor device according to claim 1, wherein alteration in the angle of inclination and increase in the free-cross sections and of the spacings between the annular members is effected in zones.

8. Reactor device according to claim 1, wherein the annular members are in the form of annular discs and/or spoked wheels.

9. Reactor device according to claim 8, wherein the annular members are covered with wire mesh.

10. Reactor device according to claim 1, wherein scoop-members are attached at least partly and/or in zones between the annular members.

11. Reactor device according to claim 1, wherein the openings in the hollow cylinder are rectangular with continuous webs, and the cross-sections of the openings are increased in the flow direction of the medium.

12. Reactor device according to claim 11, wherein the cross-sections of the openings are increased in the flow direction of the medium in zones.

13. Reactor device according to claim 1, wherein annular discs are attached as flow decelerating means on the internal circumference of the hollow cylinder.

14. Reactor device according to claim 1, wherein at least one baffle means is disposed between the annular members in the housing, said baffle means comprising a baffle plate extending substantially over the entire filling height and a perforated disc vertically connected to the hollow cylinder.

15. Reactor device according to claim 1, wherein in the vicinity of the medium and between the annular members rod-shape stripper members are attached to the housing serving to avoid adhesion and excessive entrainment of viscous media between respective pairs of annular members.

16. Reactor device according to claim 15, wherein the rod-shape stripper members have at least in part a shape similar to a ploughshare to support the transport effect.

17. Reactor device according to claim 1, wherein the medium outlet opening possesses the form of a flattened output cone.

18. Reactor device according to claim 1, wherein a terminal baffle is disposed in front of the medium outlet opening, said baffle being disposed substantially over the entire filling height.

19. Reactor device according to claim 18 wherein the terminal baffle is a wire screen or a plate with fine perforations.

20. Reactor device according to claim 1, wherein a mixer and a stripper, both connected to the hollow cylinder, are disposed in a output area of the output cone.

21. Reactor device according to claim 1, wherein the hollow cylinder is mounted eccentrically to the housing in order to increase a gas extraction area.

22. Reactor device according to claim 1, wherein a exhaust gas nozzle is disposed in rear area of the housing and has a larger cross-section than a subsequent gas extraction line, in order to reduce the gas output velocity.

23. Reactor device according to claim 1, wherein the housing includes a heat jacket through which a heat transfer medium flows.

24. Reactor device according to claim 23, wherein the heat jacket is subdivided in the flow direction into a plurality of variably heatable zones.

25. Reactor device according to claim 1, wherein an additional heating zone with a higher temperature than in the reaction chamber is provided in order to avoid deposits of oligomers.

26. Reactor device according to claim 1, wherein the diameter of the hollow cylinder is selected in dependence on the filling level of the medium, the medium taking up approximately 18–22% of the overall volume of the housing.

27. Reactor device according to claim 1, wherein at least one group of two or more adjacent annular members have a similar angle of inclination with respect to the axis of rotation and/or the same trace point.

28. Reactor device for a free-flowing medium, comprising:
   a) a cylindrical housing disposed horizontally, a medium inlet opening and a medium outlet opening at opposing ends of the housing; and
   b) a rotor being rotatably mounted in the housing, the rotor having;
      1) a hollow cylinder extending through the housing, the hollow cylinder having openings on its circumference; and
      2) a plurality of annular members, the annular members being attached to the hollow cylinder and extending from an outer surface of the hollow cylinder, the annular members being inclined with respect to the axis of rotation and mixing and/or transporting the medium by rotational movement of the rotor, the openings providing a medium and gas flow path through the hollow cylinder as the medium is mixed and/or transported.

29. Reactor device for a free-flowing medium, comprising:
   a) a cylindrical housing disposed horizontally, a medium inlet opening and a medium outlet opening at opposing ends of the housing; and
   b) a rotor being rotatably mounted in the housing, the rotor having;
      1) a hollow cylinder extending through the housing, the hollow cylinder having openings on its circumference; and
      2) a plurality of annular members, the annular members being attached to the hollow cylinder and extending from an outer surface of the hollow cylinder, the annular members being disposed inclined with respect to the axis of rotation in such a way, that the points on the circumference of the annular members, having the smallest spacing with respect to any one of the two end faces of the housing, form a helical line along the length of the rotor, the annular members mixing and/or transporting the medium by rotational movement of the rotor, the openings providing a medium and gas flow path through the hollow cylinder as the medium is mixed and/or transported.

* * * * *